(12) United States Patent
Usui et al.

(10) Patent No.: US 6,497,838 B2
(45) Date of Patent: Dec. 24, 2002

(54) PROCESS FOR PRODUCING A HOLLOW FOAMED POLYOLEFINIC RESIN CONTAINER

(75) Inventors: Nobuhiro Usui, Takatsuki (JP); Takeo Kitayama, Ibaraki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/760,814

(22) Filed: Jan. 17, 2001

(65) Prior Publication Data
US 2001/0010848 A1 Aug. 2, 2001

(30) Foreign Application Priority Data
Jan. 27, 2000 (JP) ........................................ 2000-019112

(51) Int. Cl.⁷ ................................................ B29C 51/14
(52) U.S. Cl. ........................ 264/512; 264/321; 264/554
(58) Field of Search ................................ 264/321, 547, 264/554, 512

(56) References Cited

U.S. PATENT DOCUMENTS

| | | | | |
|---|---|---|---|---|
| 2,953,814 A | * | 9/1960 | Mumford | 264/554 |
| 3,415,089 A | * | 12/1968 | Ferchland | 425/405.1 |
| 3,432,380 A | * | 3/1969 | Weber | 264/321 |
| 3,817,806 A | * | 6/1974 | Anderson et al. | 264/554 |
| 4,386,044 A | * | 5/1983 | Arndt et al. | 264/321 |
| 4,388,356 A | * | 6/1983 | Hrivnak et al. | 264/554 |
| 5,928,600 A | * | 7/1999 | Chu | 264/572 |
| 6,203,751 B1 | * | 3/2001 | Rolle et al. | 264/321 |

FOREIGN PATENT DOCUMENTS

| | | |
|---|---|---|
| EP | 0 520 508 A1 | 12/1992 |
| JP | 04-323030 A | 4/1991 |
| JP | 08-099348 A | 4/1996 |
| JP | 08-156979 A | 6/1996 |
| JP | 09-226851 A | 9/1997 |
| JP | 11-034251 A | 2/1999 |
| JP | 11-245928 A | 9/1999 |

OTHER PUBLICATIONS

Patent Abstracts of Japan, Publ. No. 11-034251A, Publ. Date: Feb. 9, 1999, Material For Food Container and Manufacture Thereof.
Database WPI, Section Ch, Week 199406, Derwent Publ. Ltd., London, GB; Class A17, AN 1994-045323, XP002166590; JP-A-06-000908 (1994).

* cited by examiner

Primary Examiner—Allan R. Kuhns
(74) Attorney, Agent, or Firm—Fitch, Even, Tabin & Flannery

(57) ABSTRACT

The present invention provides a hollow foamed polyolefin-based resin container comprising an inner layer and an outer layer, at least one of the inner and outer layers being formed of a foamed polyolefin-based resin sheet, wherein at least a side wall part of the container has a hollow portion between the inner and outer layer and a process for produciong the same, and the like. The hollow foamed polyolefin-based resin container can be used as containers for retorted food products and other containers.

6 Claims, 7 Drawing Sheets

PROCESS FOR PRODUCING A HOLLOW FOAMED POLYOLEFINIC RESIN CONTAINER

BACKGROUND OF THE INVENTION

1. Field of the Invention

The present invention relates to a hollow foamed polyolefin-based resin container having a hollow portion in at least its side wall part that can be used as containers for retorted food products and other containers, and to a process for producing the same.

2. Description of the Related Art

Although polystyrene foam has hitherto been used as containers for food products such as retorted food products, noodles in cup and soup in cup, the use of polypropylene-based foam has been studied in recent years. These containers for food products are required to have, for example, improved heat retaining property and heat insulation property that enable the containers to be touched by hands even when their contents are heated to high temperatures.

Containers for food products composed of polystyrene foam or polyolefin-based resin foam are generally produced by vacuum- or pressure-forming foamed resin sheets. Containers made of foamed polyolefin-based resin are disclosed in Japanese Patent Kokai Publication Nos. 9-226851 and 11-34251.

All the above-mentioned known foamed polyolefin-based resin containers, however, have only one resin layer constituting the containers and do not satisfy the requirement about heat retaining property, heat insulation property and the like enough. Neither process for producing a hollow foamed resin container nor process for producing a plurality of hollow foamed resin containers at the same time through a series of steps is disclosed in these publications.

SUMMARY OF THE INVENTION

The object of the present invention is to provide a hollow foamed polyolefin-based resin container having a hollow portion in at least its side wall part that can fully meet requests for heat retaining property, heat insulation property and the like even when it is used as containers for retorted food products and the other containers, and to provide a process for producing the same.

The hollow foamed resin container of the present invention is characterized by being a hollow polyolefin-based resin container comprising an inner layer and an outer layer, at least one of the inner and outer layers being formed of a foamed polyolefin-based resin sheet, wherein at least a side wall part of the container has a hollow portion between the inner and outer layers.

The above-mentioned hollow foamed polyolefin-based resin container may be produced by the vacuum-forming using a pair of mold members fittable each other including a male mold member having a configuration of the inner surface of the container and a female mold member having a configuration of the outer surface of the container and accompanying a forming processing in which a (plane) resin sheet for forming the inner layer is made to firmly touch the outer surface of the male mold member and a (plane) resin sheet for forming the outer layer is made to firmly touch the inner surface of the female mold member.

The hollow portion that is formed in the side wall part of a container may be one formed throughout the entire side wall part or one partly formed in the side part. Moreover, a structure having many hollow portions partitioned by ribs may be also possible. A hollow portion may be formed in the bottom part of a container.

In the hollow foamed polyolefin-based resin container of the present invention, it is preferable that the resin forming the foamed layer has an expansion ratio of from 1.5 to 8 times and a thickness of not greater than 6 mm and a draw ratio [(the height of the container)/(the minimum dimension of an opening of the container)] of the container of from 0.6 to 1.5. Such a container was difficult to be produced by the conventional techniques, particularly by vacuum- or pressure-forming accompanying forming processing when foamed polyolefin-based resin is used.

The minimum dimension of an opening of a container means, for example, the diameter of the opening in the case where the configuration of the opening of the container is a circle, the dimension of each side of the opening in the case where the opening is a square, the dimension of a shorter side in the case where the opening is a rectangle, and a distance between the opposite sides in the case where the opening is a regular hexagon.

It is desirable that the foamed polyolefin-based resin sheet to be used in the hollow foamed polyolefin-based resin container of the present invention has a non-foamed polyolefin-based resin layer having a thickness of from 5 to 100 $\mu$m on one side of the foamed layer. Furthermore, it is more desirable that the foamed polyolefin-based resin sheet to be used in the hollow foamed polyolefin-based resin container of the present invention has a non-foamed polyolefin-based resin layer having a thickness of from 5 to 100 $\mu$m on each side of the foamed layer.

Moreover, it is desirable that the foamed polyolefin-based resin sheet to be used in the present invention is a sheet in which at least two layers are laminated wherein each of the layers is composed of a three-layer structure of non-foamed polyolefin-based resin layer (non-foamed layer/foamed polyolefin-based resin layer (foamed layer)/non-foamed polyolefin-based resin layer (non-foamed layer). In particular, it is more desirable that the foamed polyolefin-based resin sheet to be used in the present invention is a sheet in which at least two layers of the aforementioned three-layer structured foamed polyolefin-based resin sheets are laminated, namely having at least five-layer structure of non-foamed layer/foamed layer/non-foamed layer/foamed layer/non-foamed layer.

The use of the foamed polyolefin-based resin sheet in which a non-foamed polyolefin-based resin layer is laminated improves the vacuum-formability of a hollow foamed polyolefin-based resin container. Particularly, the deeply drawing property is improved and a foamed polyolefin-based resin container having a draw ratio of not less than 0.6, which has heretofore been said difficult to be obtained, can be produced easily in a low proportion defective.

The non-foamed layer in the foamed polyolefin-based resin sheet is desirably formed of a polyolefin-based resin having a long-chain branch.

By designing the foamed polyolefin-based resin sheet to be such a laminated foam using the polyolefin-based resin having a long-chain branch as a non-foamed layer, the strength of the original resin sheet as a raw material in a heated and softened state is enhanced and the vacuum- or pressure-formability of hollow foamed polyolefin-based resin container is improved.

It is desirable that the polyolefin-based resin has a branching index [A] satisfying 0.20≦[A]≦0.98.

The polyolefin-based resin which has a branching index [A] satisfying 0.20≦[A]≦0.98 has especially high strength in its molten state among polyolefin-based resins. Providing such a non-foamed resin layer as a surface layer may give an effect of preventing the generation of unevenness caused by cells formed in the internal foamed layer by a foaming agent or caused by breakage of cells. This may result in a multi-layer foamed polyolefin-based resin sheet having high surface smoothness and superior secondary processabilities such as vacuum-formability. This also improves the vacuum- or pressure-formability of hollow containers, particularly the formability in multiple-piece production.

In the case where the branching index of the polyolefin-based resin having a long-chain branch is out of the aforementioned range, a melt viscosity decreases and the formability of hollow containers also deteriorates.

The branching index expresses the degree of long-chain branching and is a value defined by the following formula:

Branching index $[A] = [\eta]Br/[\eta]Lin$

In the formula, $[\eta]Br$ is the intrinsic viscosity of a branched polyolefin and $[\eta]Lin$ is the intrinsic viscosity of a semicrystalline linear polyolefin, which is mainly isotactic, having a weight average molecular weight substantially equal to that of the branched polyolefin.

An intrinsic viscosity is also known as an limiting viscosity number and is a measure of the ability of a polymer molecule to increase a viscosity of a solution in its general meaning. The intrinsic viscosity depends on the size and the configuration of the polymer molecule to be dissolved. Therefore, in comparison of a non-linear polymer and a linear polymer having a weight average molecular weight equal to that of the non-linear polymer, the intrinsic viscosity is a value indicating the configuration of the non-linear polymer molecule. That is, the foregoing ratio of the intrinsic viscosities is the measure of the degree of branching of the non-linear polymer and is defined as a branching index. A method for measuring the intrinsic viscosities of the polypropylene having a long-chain branch and the polyolefin-based resin having a long-chain branch are disclosed in J. Appl. Polym. Sci., 14, 2947–2963 (1970), Elliot et al The weight average molecular weight (Mw) may be measured by various methods. Methods desirably used are the GPC method and the method that was published by M. L. McConnel in American Laboratory, May, 63–75 (1978), that is, the low-angle laser light scattering photometry.

In the production process of the foamed polyolefin-based resin container of the present invention, it is desirable that the foamed polyolefin-based resin sheet to be used as an original sheet (a raw material) further comprises at least one gas barrier layer.

The gas barrier layer is a resin layer having an action of inhibiting the permeation of moisture or oxygen and is effective to secure a preservation term of food products preserved in the container produced.

The thickness of the foamed polyolefin-based resin sheet, that is the original sheet as a raw material for forming the hollow foamed polyolefin-based container, is desirably not less than 0.5 mm. The thickness of the foamed polyolefin-based resin sheet refers to a thickness of a foamed polyolefin-based resin sheet having a three-layer structure when this type of sheet is used, or to a total thickness when a foamed polyolefin-based resin sheet having more layers is used. Such an original resin sheet as a raw material may be produced by known methods such as co-extrusion using extruders.

The process for producing a hollow foamed polyolefin-based resin container of the present invention is characterized by producing a hollow foamed polyolefin-based resin container comprising an inner layer and an outer layer, at least one of the inner and outer layers being formed of a foamed polyolefin-based resin sheet, wherein at least a side wall part of the container has a hollow portion between the inner and outer layers, using a female mold member having an outer surface configuration of a container and a male mold member having an inner surface configuration of the container, and comprising:

(1) heating and softening an original resin sheet (as a raw material) while clipping and fixing the periphery of the original resin sheet with a clip, the original resin sheet being either (a) a resin sheet in which two resin sheets including a resin sheet for forming the inner layer and a resin sheet for forming the outer layer are laminated one on another wherein both of two resin sheets are formed of polyolefin-based resin and at least one of two resin sheets is a foamed polyolefin-based resin sheet or (b) a resin sheet in which two resin sheets including a resin sheet for forming the inner layer and a resin sheet for forming the outer layer are separably laminated wherein both of two resin sheets are formed of polyolefin-based resin and at least one of two resin sheets is a foamed polyolefin-based resin sheet, (hereinafter it is also referred to as a heating step) and (2) installing the male mold member and the female mold member in the opposite sides relative to the heated and softened original resin sheet, relatively moving the male and female mold members to fit them through the heated and softened original resin sheet, rendering both a gap between the female mold member and the heated and softened original resin sheet and a gap between the male mold member and the heated and softened original resin sheet of reduced pressure, thereby making the resin sheet for forming the inner layer closely touch the surface of the male mold member and the resin sheet for forming the outer layer closely touch the surface of the female mold member to form a hollow portion and to form the heated and softened original resin sheet into a shape of container; (hereinafetr it is also referred to as a releasing step) and (3) taking out the product formed into the shape of the container. (it is also referred to as a releasing step)

By the above-mentioned process, a hollow foamed polyolefin-based resin container having a hollow portion in at least its side wall part can be easily produced. The use of plural pairs of male and female mold members renders multiple-pieces production of hollow foamed resin containers possible to be produce at the same time through a series of steps.

The male and female mold members are only required that at least one of them can be moved to fit together to form a cavity for forming a container. Alternatively, both of them may be moved.

The above-mentioned process for producing a hollow foamed polyolefin-based resin container of the present invention is characterized by further comprising (4), after the heating step (1), generating a pressure difference between both sides of the heated and softened original resin sheet to expand the heated and softened original resin sheet so as to project toward the lower pressure side, wherein the forming step (2) is made (2') a forming step comprising installing the male mold member and the female mold member in the opposite sides relative to the heated and softened original resin sheet so that the male mold member is located in the lower pressure side, moving the male mold member relatively toward the female mold member while making the male mold member touch the heated and softened original resin sheet from its projecting side, thereby making the male mold member fit to the female mold member, rendering both a gap between the female mold member and the heated and softened original resin sheet and a gap between the male mold member and the heated and softened original resin sheet of reduced pressure, thereby making the resin sheet for forming the inner layer closely touch the surface of the male mold member and making the resin sheet for forming the outer layer closely touch the surface of the female mold member to form a hollow portion and to form the heated and softened original resin sheet into a shape of container.

In such a way, a hollow foamed polyolefin-based resin container having a draw ratio of from 0.6 to 1.5 can be easily produced.

In general, when producing resin containers by vacuum- or pressure-forming, as disclosed in aforementioned Japanese Patent Kokai Publication Nos. 9-226851 and 11-34251, containers are formed by heating and softening a resin sheet to make it touch an edge of an opening of a female mold member and sucking the sheet toward the female mold member to stretch it to touch and cover the surface of the female mold member. In the course of such operations, the part of the original resin sheet to constitute the edge of a container is applied with a stress that stretches the original resin sheet in the direction toward the side wall part while touching the edge of the female mold member concurrently with the suction of the parts for forming the side wall part and the bottom part of a container.

In the case of vacuum-forming a foamed polyolefin-based resin, there is a formability problem being more serious than that with polystyrene foam. Since polystyrene resin is a glassy resin, its physical strength decreases slowly as its temperature rises in the vicinity of temperatures at which the resin can be formed and the strength of the resin at the time of its forming is therefore relatively high. For such reasons, in the case of forming with stretching, the forming can be easily conducted even though the polystyrene foam sheet receives such a stress in its part for constituting the edge of a container that the part is stretched toward the container-forming parts adjacent to that part. In contrast, since polyolefin-based resin is a crystalline resin, its physical strength suddenly decreases with its temperature rises in the vicinity of temperatures at which the resin can be formed.

In other words, the most serious problem that arises in the course of the vacuum-forming of a foamed polyolefin-based resin sheet using, for example, a female mold member is that since the foamed polyolefin-based resin sheet has only insufficient strength in its softened state, when the foamed polyolefin-based resin sheet is stretched to enter the inside of a female mold member, the foamed polyolefin-based resin sheet does not have sufficient strength to slide itself at the flange of the opening of the female mold member, and therefore, the foamed polyolefin-based resin sheet is stretched only in its non-touching part into the female mold member cavity while being fixed in its edge. As a result, local stretching occurs in the foamed polyolefin-based resin sheet and the foamed polyolefin-based resin sheet itself or cells in the foam break results in defects in products and high proportion defective. Therefore, such a method is hard to be called a practical forming method.

In the present invention, the heated and softened original resin sheet is uniformly expanded to be stretched by the generation of pressure difference between both sides of the heated and softened original resin sheet in expanding step (4), and then forming step (2') is conducted. In the forming step (2'), the male mold member having a configuration of a container is made to touch the heated and softened original resin sheet gradually from its tip part to the entire part with approaching from the projecting side of the heated and softened original resin sheet. At the same time, the male mold member is moved toward the female mold member, thereby making the aforementioned original resin sheet as a raw material fitted with the female mold member. Both the gap between the female mold member and the heated and softened original resin sheet and the gap between the male mold member and the heated and softened original resin sheet are vacuumed, thereby making the resin sheet for forming the inner layer closely touch the surface of the male mold member and making the resin sheet for forming the outer layer closely touch the surface of the female mold member to form a hollow portion and to form the heated and softened original resin sheet into a shape of container. By conducting such a way, a hollow container can be produced by vacuum-forming without suffering from any local stretching since forming is done under the conditions where a heated and softened foamed polyolefin-based resin sheet having a low strength is preliminarily stretched to some extent.

It is necessary that at least one of the resin sheet for forming the inner layer and that for forming the outer layer to be used as original resin sheets is a foamed polyolefin-based resin sheet. Both of them may be either the same or different although it is necessary that both of them are formed of polyolefin-based resin. "Being separably laminated" means to be formed in the form of a single layer as an original sheet by means of adhesion, thermal welding or the like, but to be constituted so as to separate to form a hollow portion in the forming step. In addition, "being laminated one on another" means being used as an original resin sheet in a state where the resin sheet for forming the inner layer and that for forming the outer layer are merely piled.

It is a desirable embodiment that a proper air flow hole is provided in order to easily form a hollow portion between the resin sheet for forming the inner layer and the resin sheet for the outer layer in the forming step.

Moreover, the process for producing a plurality of a hollow foamed polyolefin-based resin containers of the present invention is characterized by producing a plurality of a hollow foamed polyolefin-based resin container comprising an inner and an outer layer, at least one of the inner and outer layers being formed of a foamed polyolefin-based resin sheet, wherein at least a side wall part of the container has a hollow portion between the inner and outer layers, using a female mold member having an outer surface configuration of a container and a male mold member having an inner surface configuration of the container, and comprising:

(5) heating and softening an original resin sheet while clipping and fixing the periphery of the original resin sheet with a clip, the original resin sheet being either (a) a resin sheet in which two resin sheets including a resin sheet for forming the inner layer and a resin sheet for forming the outer layer are laminated one on another wherein both of the two resin sheets are formed of polyolefin-based resin and at least one of the two resin sheet is a foamed polyolefin-based resin sheet or (b) a resin sheet in which two resin sheets including a resin sheet for forming the inner layer and a resin sheet for forming the outer layer are separably laminated wherein both of the two resin sheets are formed of polyolefin-based resin and at least one of the two resin sheet is a foamed polyolefin-based resin sheet, (hereinafter it is also referred to as a heating step) and (6) making a partitioning member touch or almost touch the heated and softened original resin sheet to define container-forming areas, (hereinafter it si also referred to as a partitioning step)

(7) generating a pressure difference between both sides of the heated and softened original resin sheet so that the side where the partitioning member is present become the lower pressure side, making the heated and softened original resin sheet firmly touch the partitioning member, and projecting the heated and softened original resin sheet toward the lower pressure side in every container-forming area, (hereinafter it is also referred to as an expanding step)

(8) installing the male mold member and the female mold member in the opposite sides relative to the heated and softened original resin sheet so that the male mold member is located in the lower pressure side, moving the male relatively toward the female mold member while making the male mold member touch the heated and softened original resin sheet from its projecting side, thereby making the male mold member fit to the female mold member, rendering both a gap between the female mold member and the heated and softened original resin sheet and a gap between the male mold member and the heated and softened original resin sheet of reduced pressure, thereby making the resin sheet for forming the inner layer closely touch the surface of the male mold member and making the resin sheet for forming the outer layer closely touch the surface of the female mold member to form a hollow portion and to form the heated and softened original resin sheet into a shape of container, (hereinafter it is also referred to as a forming step)

(9) taking out the product formed into the shape of the container. (hereinafter it is also referred to as a releasing step)

By the production process of such a constitution, it becomes possible to produce a plurality of hollow foamed polyolefin-based resin containers using a foamed polyolefin-based resin sheet therein at the same time in a low proportion defective even when producing, in particular, a hollow foamed polyolefin-based rersin container having a draw ratio of not less than 0.6 through a series of steps in multiple-piece production.

In the partitioning step (6), in the case where the partitioning member touches the original resin sheet, the container-forming areas are defined by the touching surface, or in the case where the portioning member almost touches the foamed sheet, the container-forming areas are defined at the time when the partitioning member firmly touches the original resin sheet for the first time when the expansion is commenced in the expanding step (7).

It is a desirable embodiment that a trimming step of cutting away an excess part of the original resin sheet the edge of the container in the releasing step (9).

It is a desirable embodiment that the partitioning member is such a base body having a rib standing thereon, wherein the end surface of the rib touches the heated and softened original resin sheet to define the container-forming area (a rib type), and wherein the side where the partitioning member touches the heated and softened original resin sheet is set to be the lower pressure side. In addition, it is also a desirable embodiment that the partitioning member is a frame body which defiones the aforementioned container-forming areas cavities, wherein the frame body touches the heated and softened original resin sheet to define the container-forming areas (a frame type), and wherein the side where the partitioning member touches the heated and softened resin sheet is set to be the lower pressure side.

In any case, many container-forming areas can be easily formed in one foamed polyolefin-based resin sheet.

When the frame body is used as the partitioning member, since the thickness of the frame body is thinner than that of a rib-type, it may be also possible to make the frame body touch the heated and softened original resin sheet to form the container-forming areas and then move a heater forward to heat. In this case, it is also a desirable embodiment that a cooling liquid is passed in the frame body in order to prevent the temperature of the frame body from rising in repeated forming. Moreover, the frame body is preferably constituted in such a manner that the frame is equipped with a proper arm so that the frame moves through the action of the arm.

When the partitioning member is the frame body, it is another desirable embodiment that the frame body is fixed to or integrated with the clip instead of the above-mentioned constitution of equipping the arm. In the case of such a modified constitution, the partitioning step of forming the container-forming areas is conducted at the same time the original resin sheet is clipped and fixed.

The use of the partitioning member allows the original resin sheet to be partitioned into container-forming areas and to be formed into a configuration of containers after being preliminarily stretched uniformly.

In the above-mentioned expanding step (4) or (7), it is preferable to vacuum in one side relative to the heated and softened original resin sheet while keeping at atmospheric pressure in the other side. A pressure difference can be easily adjusted by vaccuming, and therefore, vaccuming can achieve nice adjustment of the projecting height of the heated and softened original resin sheet with higher accuracy than pressurizing does.

In the above-mentioned expanding step, it is preferable that the projecting height of the heated and softened original resin sheet (the height from the clipping level by the clip) is set to be 50% or more, preferably from 70 to 100%, of the height of the container.

Setting the projecting height of the foamed polyolefin-based resin sheet to be 50% or more of the height of the container can control the local stretching of the sheet that especially appears in the part of a resin sheet which forms the side wall part of a container during forming. It also allows a hollow foamed polyolefin-based resin container, particularly a hollow foamed polyolefin-based resin container having a draw ratio of not less than 0.6 or more, to be produced more easily through a series of steps in a lower proportion defective. By such a manner, it becomes possible to produce a plurality of hollow foamed polyolefin-based resin containers at the same time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

DETAILED DESCRIPTION OF THE INVENTION

Figure 1:
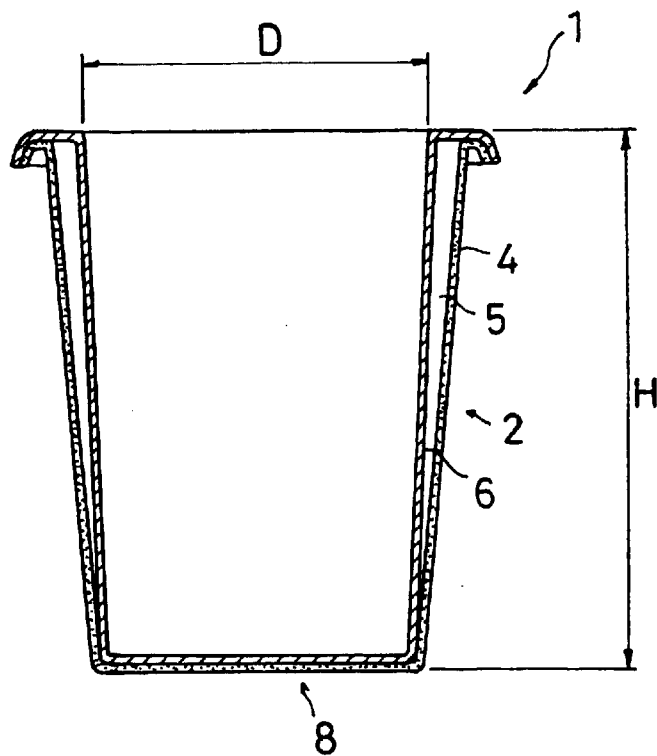
FIGS. 1(a) and 1(b) are views illustrating an example of a hollow foamed polyolefin-based resin container.
Figure 1:
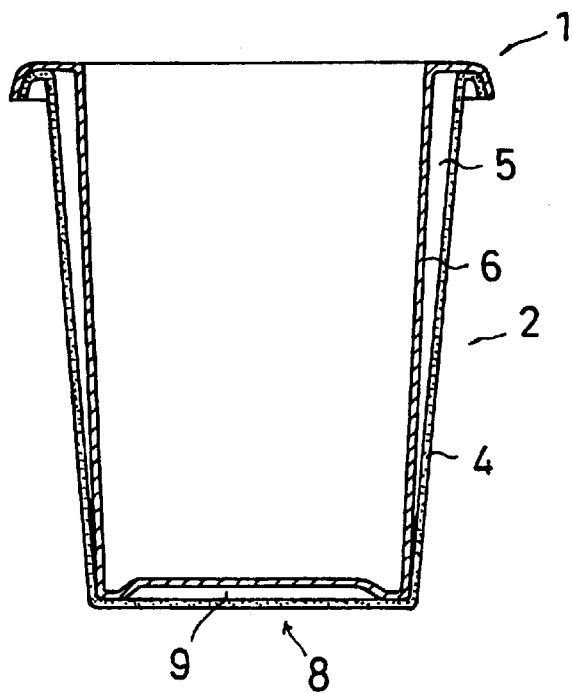

FIG. 1 is a sectional view illustrating an example of a hollow foamed polyolefin-based resin container of the present invention. The containers depicted in FIGS. 1(a) and (b) are both almost cylindrical containers. In container 1 in FIG. 1(a), a hollow portion 5 is formed between an inner layer 6 and an outer layer 4 of a side wall 2. The aperture D is the minimum dimension of an opening of the container, H is the height of the container and a draw ratio is defined by H/D. The foamed polyolefin-based resin container illustrated in FIG. 1(b) has a hollow portion 9 also in its bottom part 8.

Figure 2:
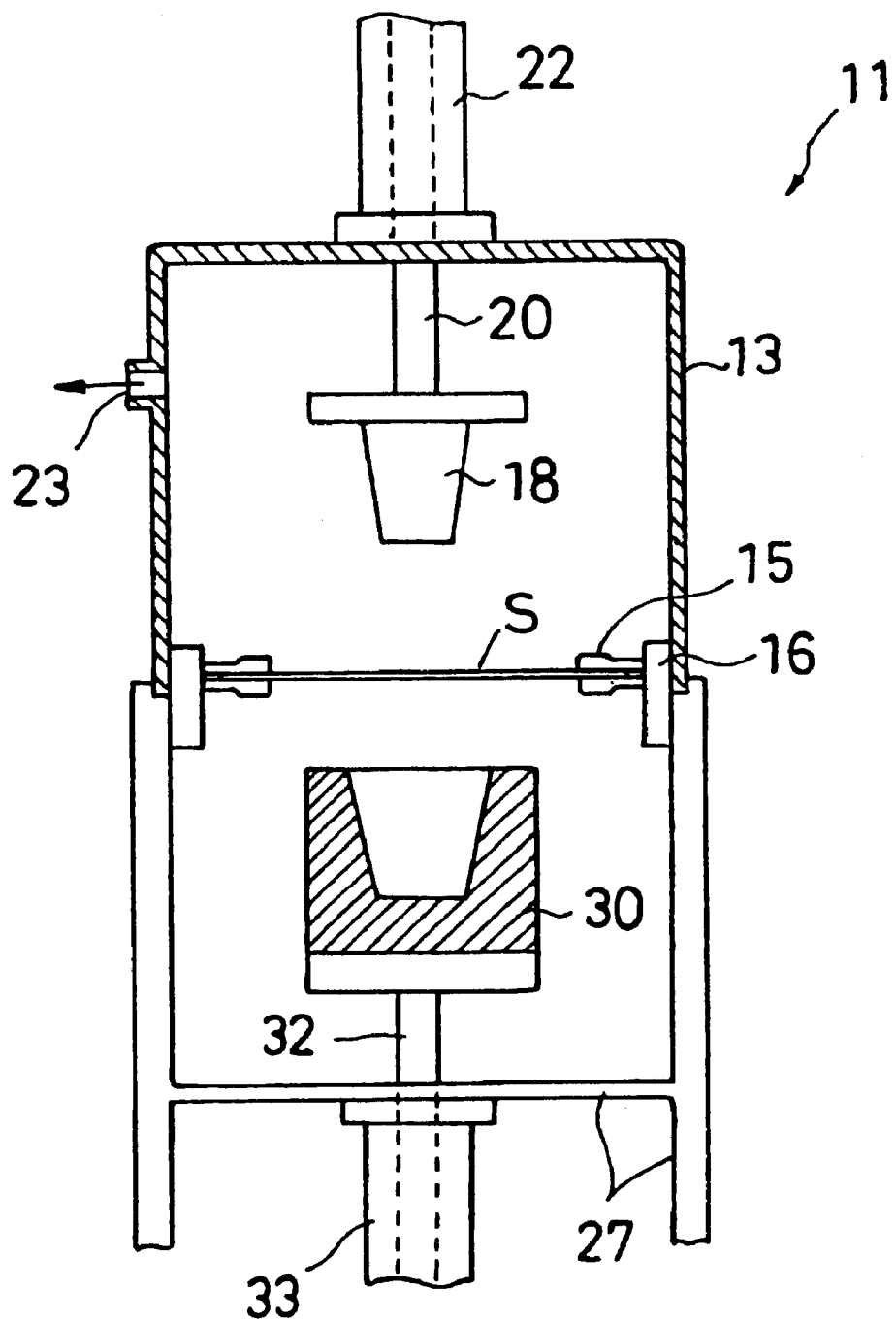
FIG. 2 illustrates an example of an apparatus for producing a hollow foamed polyolefin-based resin container.

FIG. 2 illustrates an example of an apparatus (a vacuum-forming apparatus) for producing a hollow foamed polyolefined resin container of the present invention. The vacuum-forming apparatus 11 is composed of a box body 13, a frame 27 for supporting the box body, a clip 15 for clipping an original resin sheet S, a clip operation member 16 for opening and closing the clip 15, a male mold member 18, a linear actuator 22 for supporting the male mold member 18 through a rod 20 in such a manner that the male mold member can be freely moved forward and backward, a female mold member 30, a linear actuator 33 that supports the female mold member 30 through a female mold member-supporting rod 32 and is fixed to the frame 27, a vacuuming unit (not shown) for reducing the pressure inside the box body to a predetermined pressure through an air hole 23 provided in the box body 13. Although not shown in the drawing, a heater for heating the original resin sheet S is installed at the heating position and the withdrawal position in such a manner that the heater can be moved freely.

The clip 15 may also be one that clips the original resin sheet S at several points, preferably at four points. It may clip the original resin sheet S at two or four sides facing one another or may be a frame body-like clip of, for example, circular or quadrangular shape.

The pressure reducing unit may be any one that can reduce the pressure inside the box body 13 to a predetermined pressure and can adjust the heated and softened original resin sheet at a predetermined projecting height.

Figure 3:
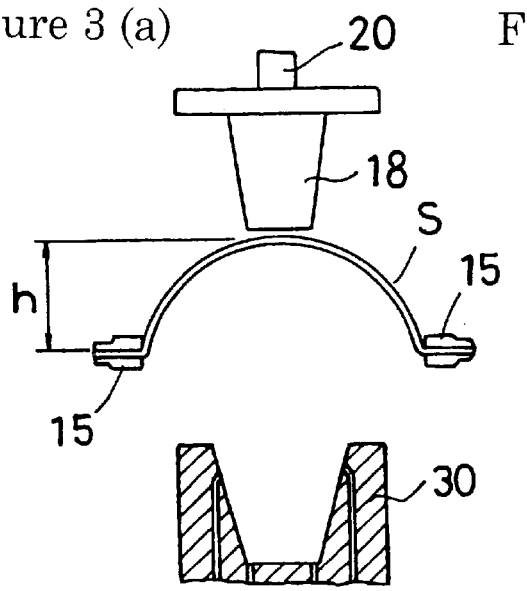
FIGS. 3(a)–(e) illustrate a process for producing a hollow foamed polyolefin-based resin container using the apparatus shown in FIG. 2.
Figure 3:
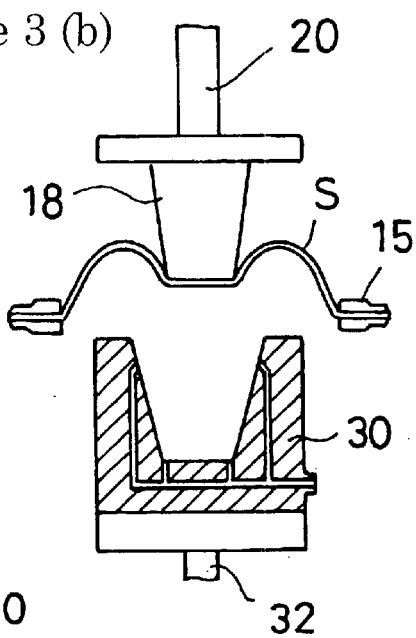
Figure 3:
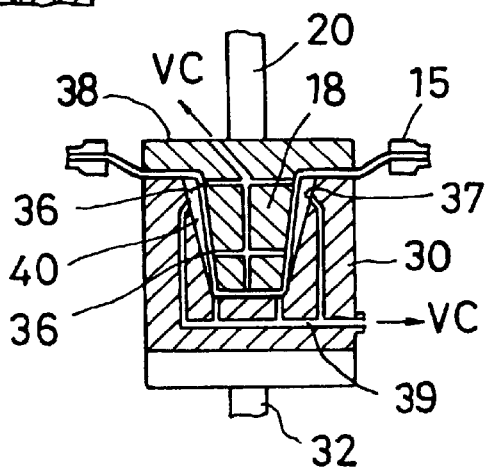
Figure 3:
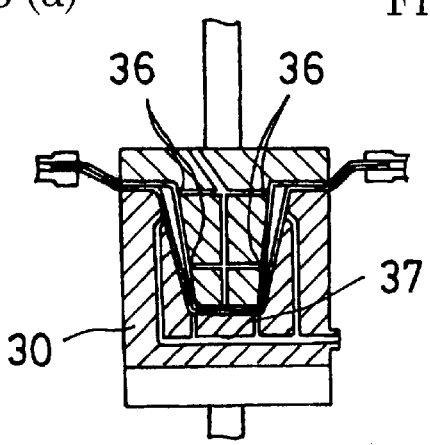
Figure 3:
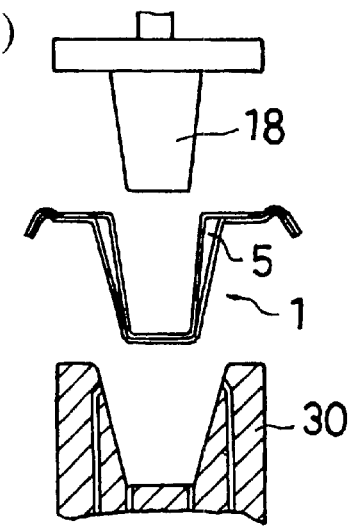

A process for producing a hollow foamed polypropylene-based resin container of the present invention using the apparatus will be explained based on the example shown in FIG. 3. The embodiment depicted in this drawing is one using a vacuum-forming apparatus like that shown in FIG. 2. A box body 13 is not shown.

Although a heating step is not shown, it is a step of uniformly heating from its upper and lower-sides with heaters and softening an original resin sheets composed of a resin sheet 6S for forming an inner layer and a resin sheet 4S for forming an outer layer laminated thereon and is conducted by known techniques. The heaters to be used in the heating step are installed in the vacuum-forming apparatus so as to be able to come the positions close to the male mold member and the female mold member and their backed positions. In the example shown here, although the apparatus is designed so that the heating and forming steps are conducted in the box body while fixing an original resin sheet with the clip 15, another constitution may be applied in which the original resin sheet can be continuously moved so as to be subjected to the heating step and the forming step at different positions, a heating zone in which a heater is fixed and a forming zone are set up, and an original resin sheet is heated in the heating zone and then is moved to the forming zone and formed there.

Although as the heater for heating the original resin sheet, any one that can heat the original resin sheet uniformly may be used without any limitations, the use of a plane heater is preferable.

FIG. 3(a) illustrates an expanding step. The original resin sheet S is clipped with the clip 15 and heated from its upper and lower sides with the heaters. Then, the inside of the box body 13 is vacuumed and the side of the male mold member is set to be the lower pressure side. Thereby the original resin sheet is projected toward the male mold member 30 When representing the projecting height by h and the height of the container by H, it is preferable that h≧0.5H as previously mentioned.

FIGS. 3(b)–(d) illustrate the forming step. The parts where a side wall part 2 of a container is to be formed shown in FIGS. 3(c) and (d) are magnified and illustrated in FIGS. 4(a) and (b), respectively.

The male mold member 18 is moved toward the original resin sheet S from above its projecting top part (FIG. 3(a)) and touch the original resin sheet S at its projecting top part first (FIG. 3(b)). Subsequently, the male mold member 18 is moved toward the female mold member 30 while being covered on its outer surface with the original resin sheet S. In the side of the female mold member 30, the female mold member 30 has been moved to the position from which the heater has been backed, so that the edge of its opening comes close to the original resin sheet. The bottom surface of the male mold member 18 holding the original resin sheet S on its outer peripheral surface and the edge of the female mold member 30 are engaged at a position where the foamed polyolefin-based resin sheet is clamped. In this state, the foamed polyolefin-based resin sheet S comes into conditions where it faces the forming cavity of the female mold member 30 (FIG. 3(c), and FIG. 4(a) enlarged.).

The apparatus is designed in such a manner that in each of the surfaces of the male mold member 18 and the female mold member 30, a plurality of air holes 36 and 37 are formed and the air exhausted through the air hole 36 and that through the air hole 37 are sent to the vacuuming apparatus VC via the air channel 38 in the male mold member 18 and the air channel 39 in the female mold member 30, respectively.

When the air present between the outer surface of the male mold member 18 and the original resin sheet 41 and that present between the inner surface of the female mold member 30 and the foamed polyolefin-based resin sheet 40 in the state shown in FIG. 3(c) are exhausted through the air holes 36 and 37, the original resin sheet S is separated. The resin sheet 4S for forming the outer layer and the resin sheet 6S for forming the inner layer are sucked and closely touch the surface of the female mold member 30 and that of the male mold member 18, respectively. Thereby, the inner layer 6 and the outer layer 4 are formed and the forming is completed (FIG. 3(d), and FIG. 4(b) enlarged).

FIG. 4(e) shows a releasing step. The fixing of the original resin sheet with the clip is released and the male mold member 18 and the female mold member 30 are released from their engaged state. Thereby, the container 1 becomes possible to be released. After trimming an excess part of the original resin sheet that extends from the edge of the opening of the container 1, the container 1 is finished. Another step of folding the edge of a container downwardly may be added. Alternatively, a portion having such configuration may be provided to the mold member and a folded part may be formed at the same time of forming the container.

Figure 5:
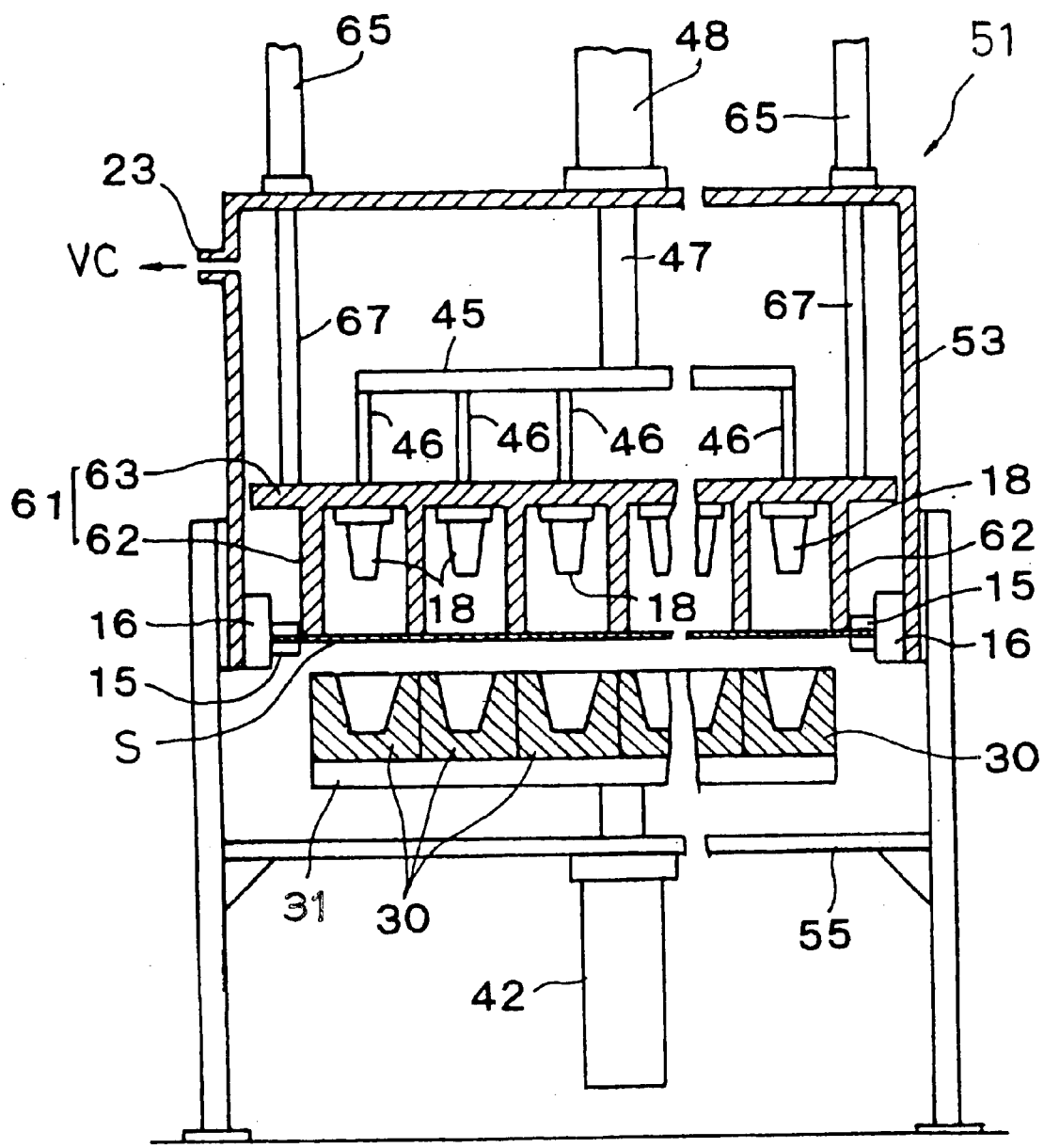
FIG. 5 illustrates an example of an apparatus for multiple-piece production for producing a hollow foamed polyolefin-based resin containers.

FIG. 5 illustrates an example of an apparatus for multiple-pieces production for producing a hollow foamed polyolefin-based resin containers of the present invention at the same time through a series of steps.

This apparatus is also a forming apparatus for vacuum-forming like that shown in FIG. 2. The forming apparatus 51 contains a box body 53, a frame 55, a partitioning member 61 composed of a base 62 and ribs standing on the base, a female mold member 30, a male mold member 18, a clip for clipping an original resin sheet S and a clip operation member 16 for opening and closing the clip. The partitioning member 61 is installed in the region inside the box body 53 so that the region is rendered the lower pressure side by vacuuming. Like the apparatus shown in FIG. 1, the box body 53 has an air hole 23 and is connected to a vacuuming-apparatus VC. This drawing illustrates a state where after heating and softening the original resin sheet S, the partitioning member was moved forward, and it has touched the original resin sheet S and container-partitioning areas have been defined by the touching surface. The heaters are not shown.

Each of the male mold members 18 is positioned inside a frame that defines an area separated by a rib 62 and is fixed to a male mold member-supporting base 45 through a male mold member-supporting rod 46 which passes through the base 63 of the partitioning member 61. The male mold member-supporting base 45 is connected to a linear actuator 48 through a rod 47. The vacuum-forming apparatus is, as a whole, constituted in such a manner that the male mold member 18 can be freely moved forward and backward so that it goes forward from its backed position toward the side of the female mold member 30.

The female mold member 30 is fixed to a female mold member base 31 and is designed so as to be freely moved between the position close to the foamed polyolefin-based resin sheet S and a backed position by a hydraulic cylinder 42, which is an example of the linear actuator, mounted to a frame 55.

Figure 6:
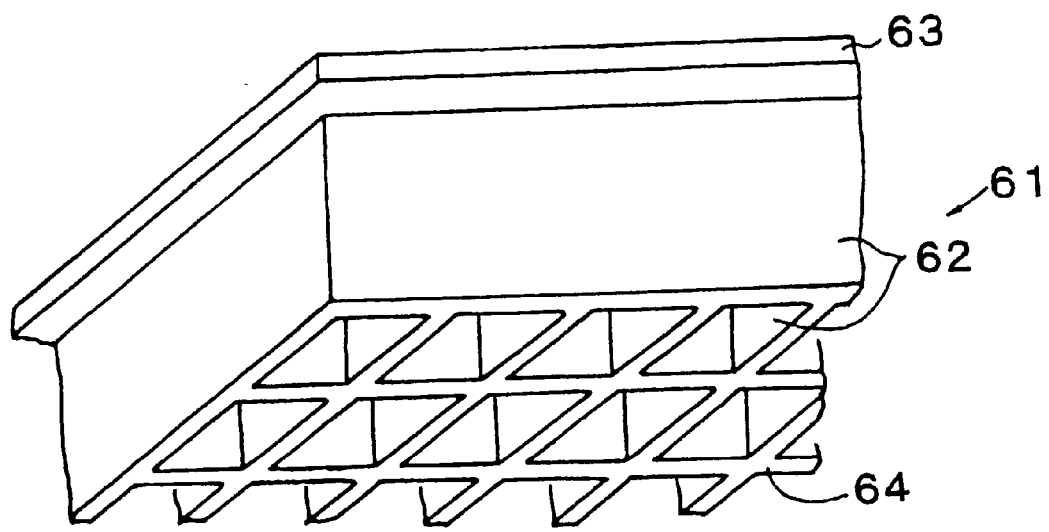
FIGS. 6(a)–(b) illustrate an example of a partitioning member.
Figure 6:
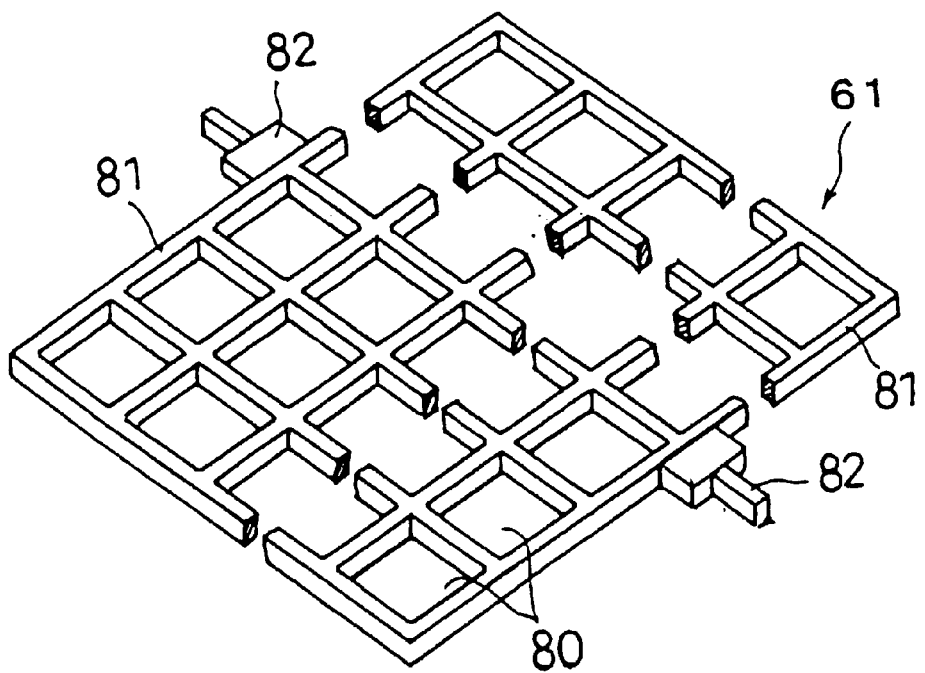

FIG. 6 illustrates an example of a partitioning member 61. The partitioning member 61 for defining the container-forming areas together with the original resin sheet S in the above-mentioned vacuum-forming apparatus 51 is illustrated in detail in FIG. 6(a) as a partial perspective view. The partitioning member 61 is made up of a rib 62 standing on a base 63. The end surface 64 of the rib 62 touches the original resin sheet S and the touching surface F defines the container-forming areas.

In FIG. 6(b), an example of a partitioning member of a lattice-like frame type. In this example, an outer frame 81 of a frame body having cavities 80 is equipped with connectors 82 for connecting and fixing the partitioning member to a clip operation member. Container-forming areas are defined in correspondence to the cavities 80. The partitioning member 61 shown in FIG. 6(b) is designed to serve as a clip. For example, it clips and fixes a foamed resin sheet in combination with a rectangular frame-like clip corresponding to the outer frame 81.

It may also be possible to define container-forming areas by making the partitioning member shown in FIG. 6(a) and the partitioning member 61 shown in FIG. 6(b) touch a foamed resin sheet S clipped and fixed with a clip from the opposite sides.

In the case where a partitioning member 61 is separated from a clip, a clip 15 may be one that clips the original resin sheet S at several points, preferably at four points, as in the case of forming containers one by one. It may clip the original resin sheet S at two or four sides facing one another or may be a frame body-like clip of, for example, circular or quadrangular shape.

Figure 4:
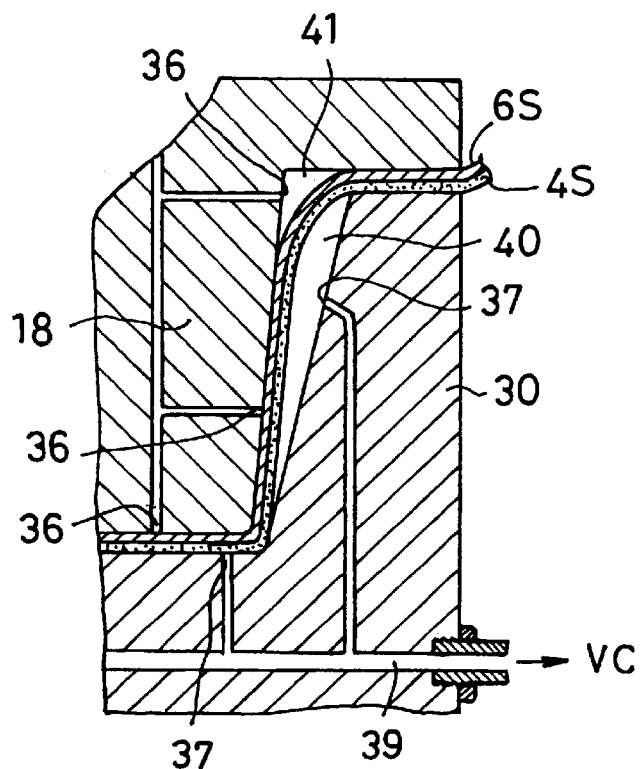
FIGS. 4(a)–(b) illustrate the formation of a hollow portion in a process for producing a hollow foamed polyolefin-based resin container.
Figure 4:
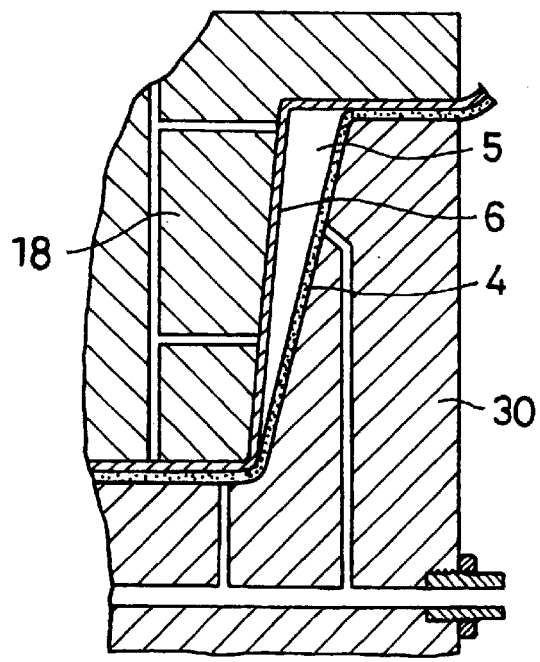

In the case of producing foamed resin containers by the use of the vacuum-forming apparatus shown in FIG. 4, the production process is the same as that described above for forming containers one by one except that the partitioning step is added.

Figure 7:
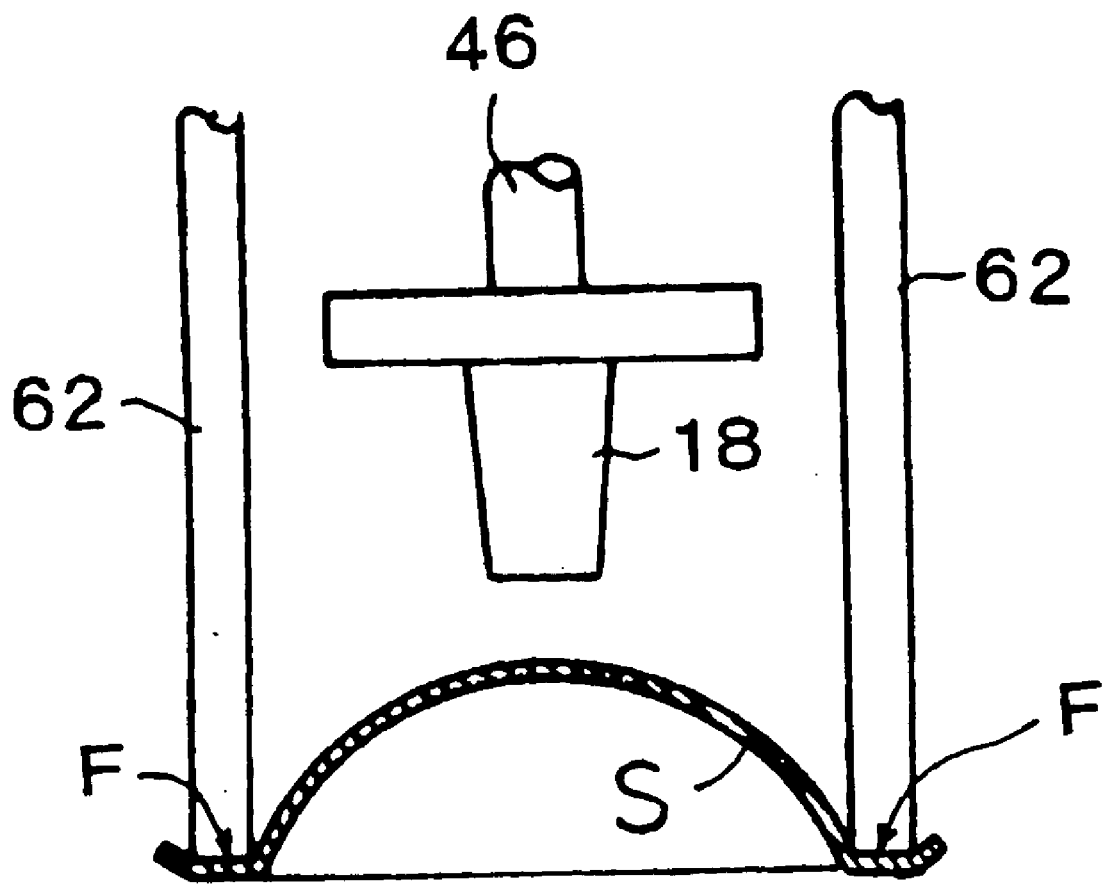
FIG. 7 illustrates a step of expanding an original resin sheet in a multiple-piece production.

FIG. 7 illustrates a step of expanding an original resin sheet in a multiple-piece production, the step following the partitioning step. The end surface 64 of the rib 62 of the partitioning member 61 touches the foamed polyolefin-based resin sheet S heated and softened in the heating step (not shown) and the touching surface F partitions to define container-forming areas (the partitioning step). Then, the foamed polyolefin-based resin sheet S inside each of the container-forming areas uniformly projects toward the male mold member 18 to form a hemisphere by reducing the pressure inside the box body 53, that is, in the side of the partitioning member 61, to a predetermined degree. After this step, hollow containers are produced through steps the same as those shown in the above-explained FIGS. 3(b)–(e).

In a production apparatus of such a type that a original resin sheet is projected by pressurizing (a pressure-forming apparatus), a box body 53 is installed in the side of the female mold member 30. By pressurizing inside the box body 53, the original resin sheet projects toward the side of the male mold member 18. In the case where containers are formed by the pressurizing system, it is difficult to adjust the projecting height of the original resin sheet depending upon the type of the original resin sheet as mentioned previously. However, for example, installing a leak valve to the box body and adjusting the opening degree of the valve permit the projecting height of the original resin sheet to be controlled.

The polyolefin-based resin used in the foamed polyolefin-based resin container of the present invention is exemplified by homopolymers of ethylene, propylene, butene and the like, copolymers obtained from two or more kinds of monomers selected from the aforementioned monomers and copolymers of at least one kind of monomer selected from the aforementioned monomers and other monomers. Examples of the copolymers include an ethylene/α-olefin copolymer and a propylene/α-olefin copolymer.

Examples of polyethylenes (PE) or copolymers of ethylene and other monomers, that is, ethylene-based resins include polyethylenes such as low density polyethylene and high density polyethylene; ethylene/α-olefin copolymers such as an ethylene/propylene copolymer, an ethylene/butene-1 copolymer, an ethylene/4-methyl-1-pentene copolymer, an ethylene/hexane-1 copolymer and an ethylene/octane-1 copolymer; ethylene-based copolymers made up of repeat units derived from at least one kind of vinyl monomer and repeat units derived from ethylene such as an ethylene/methyl methacrylate copolymer and an ethylene/vinyl acetate copolymer; and mixtures thereof.

As the propylene/α-olefin copolymer, propylene-based polymers such as a propylene/α-olefin block copolymer and a propylene/α-olefin random copolymer, and mixtures thereof may be mentioned. Examples of the α-olefin in the propylene/α-olefin block copolymer and the propylene/α-olefin random copolymer include α-olefins having 2 or from 4 to 6 carbons such as ethylene, butene-1 and octane-1.

Among the above-listed polyolefins, examples of preferable raw materials as polyolefin-based resins for forming the foamed layer include (a) a polypropylene (PP) having a long-chain branch and (b) a polypropylene prepared by producing, in a first stage, a crystalline PP having an intrinsic viscosity of 5 dl/g or more and successively producing, in a second stage, a crystalline PP having an intrinsic viscosity of less than 3 dl/g, the polypropylene containing the PP obtained in the first stage in an amount of 0.05 to 25% by weight and having, as a whole, an intrinsic viscosity of less than 3 dl/g and Mw/Mn of less than 10 because the use of these specific polyolefins results in high uniformity of the foam and in a multi-layer foamed polyolefin sheet having especially superior vacuum-formability. One of the commercially available products of (a) is Polypropylene PF814 manufactured by Montell.

Considering the influence to the environment and the like, a foaming agent to be used for forming the foamed layer is preferably an inert substance such as water and carbon dioxide gas. In particular, when polypropylene is used as a resin for constituting a foamed layer, the use of carbon dioxide gas is preferred.

Commercially available products of polypropylenes having a long-chain branch include the aforementioned Montell's product and products manufactured by Sumitomo Chemical Co., Ltd. Although the thickness of the non-foamed layer is not particularly limited as long as surface smoothness, namely appearance, of the foamed polyolefin-based resin sheet is good, it is 1 $\mu$m or more, preferably 10 $\mu$m or more, more preferably 50 $\mu$m or more. The upper limit of the thickness may be set depending on the thickness, application, etc. of the foamed polyolefin-based resin sheet. If the non-foamed layer is too thick, the foamed layer cannot fully show its characters.

In the present invention, the non-foamed layer is a layer having an expansion ratio of from 1.0 to 1.5 time, preferably from 1.0 to 1.1 time, and the foamed layer is a layer having an expansion ratio of from 1.5 to 8 times, preferably from 3 times to 6 times. If the expansion ratio of the foamed layer is less than 1.5 time, characters that foams are required to have, such as light weight, heat insulation property and the like become insufficient. If the expansion ratio of the foamed layer exceeds 8 times, breakage of cells easily occurs in the forming of the foamed polyolefin-based resin sheet. The expansion ratio may be adjusted by adjusting the quantity of a foaming agent to be used or by conducting vacuum-forming after the forming of the foamed polyolefin-based resin sheet.

The above-mentioned foamed polyolefin-based resin may be produced by a method of the lamination of the foamed resin sheet and the non-foamed resin sheet and a method of the co-extrusion of a resin for constituting the foamed layer and the non-foamed layer, and the like.

In the foamed polyolefin-based resin sheet of the present invention, a resin for constituting a gas barrier layer that is preferably formed is not particularly limited and known gas barrier resins may be used. Specific examples of such gas barrier resins include the following:

Saponified products of polyvinyl esters such as polyvinyl alcohol; saponified products of ethylene/vinyl ester copolymers such as ethylene/vinyl alcohol copolyer; polyester resins such as polyethylene terephthalate, polybutylene terephthalate, polyethylene naphthalate and polyhydroxy benzoic acid; polyaminde resins such as nylon-6, nylon-6, 6/methaxylene diamine/adipic acid condensation polymer, polymethyl methacryl imide, diethylene triamine/adipic acid copolymer and its salts; aramid resin; acrylic resins such as polymethyl methacrylate, polyacrylic acid, poly(sodium acrylate), poly(2-hydroxyethyl acrylate), poly(2-hydroxyethyl methacrylate), polyacrylamide, ethylene/acrylic acid copolymer and its salts; halogen-containing resins such as polyvinyl chloride, polyvinylidene fluoride and polytetrafluoroethylene; engineering plastics such as polycarbonate resin, polysulfone resin, polyethersulfone resin, polyether ether ketone resin, polyphenylene ether resin, polyphenylene oxide resin, polyallylene sulfide resin, polymethylene oxide resin and polyacetal resin. So-called modified resins, which may be obtained by graft modification, crosslinking or molecular chain terminal modification of these resins, may also be employed.

The gas barrier layer to be used in the present invention is formed by laminating a gas barrier layer in the form of a gas barrier resin film with a foamed polyolefin-based resin sheet. As a laminating method, known methods such as dry lamination may be employed. The gas barrier resin film may be produced by a method of forming a film from the aforementioned resin or its composition in a molten state or a method of forming a liquid film from a solution of the aforementioned resin or its composition and then drying it.

The method of forming a film from a resin or its composition in a molten state is not limited and can be exemplified by a co-extrusion method, a melt coating method and an extrusion lamination method applied to usual forming techniques such as T-die forming, inflation forming, injection mold membering, blow mold membering and stretching blow mold membering. It is also a desirabl embodiment that the film formed by the aforementioned methods is subjected to stretching that is conventionally conducted, such as uniaxial stretching, zone stretching, flat sequential stretching, flat simultaneous biaxial stretching and tubular simultaneous stretching.

To obtain a film by a method for producing a film by dissolving a resin or its composition in a solvent, forming a liquid film from the resultant solution and then drying it, a method for coating a release film with a resin or its composition containing a medium such as water to form a liquid film, drying the film and then peeling it off may be employed, for example.

The method for coating may be exemplified by roll coating methods such as the direct gravure method, the reverse gravure method, the microgravure method, the two roll beat coating method and the bottom feed three reverse coating method, the doctor knife method, the die coating method, the dip coating method, the bar coating method, and coating methods combining the preceding methods.

What is claimed is:

1. A process for producing a hollow foamed polyolefin-based resin container comprising an inner layer and an outer layer, at least one of the inner and outer layers being formed of a foamed polyolefin-based resin sheet, wherein at least a side wall part of the container has a hollow portion between the inner and outer layers, the process using a female mold member having an outer surface configuration of the container and a male mold member having an inner surface configuration of the container, the process comprising:

(1) heating and softening an original resin sheet while clipping and fixing the periphery of the original resin sheet with a clip, wherein said original resin sheet is either (a) a resin sheet in which two resin sheets including a resin sheet for forming the inner layer and a resin sheet for forming the outer layer are laminated one on another wherein both of the two resin sheets are formed of polyolefin-based resin and at least one of the two resin sheets is a foamed polyolefin- based resin sheet or (b) a resin sheet in which two resin sheets including a resin sheet for forming the inner layer and a resin sheet for forming the outer layer are separably laminated wherein both of the two resin sheets are formed of polyolefin-based resin and at least one of the two resin sheets is a foamed polyolefin-based resin sheet;

(2) installing the male mold member and the female mold member in the opposite sides relative to the heated and softened original resin sheet, relatively moving the male and female mold members to fit them to the heated and softened original resin sheet, rendering both a gap between the female mold member and the heated and softened original resin sheet and a gap between the male mold member and the heated and softened original resin sheet of reduced pressure, thereby making the resin sheet for forming the inner layer closely touch the surface of the male mold member and making the resin sheet for forming the outer layer closely touch the surface of the female mold member to form a hollow portion and to form the heated and softened original resin sheet into a shape of container; and (3) removing the product that has been formed into the shape of the container.

2. The process for producing a hollow foamed polyolefin-based resin container according to claim 1, wherein after step (1), the process further comprises step (4), generating a pressure difference between both sides of the heated and softened original resin sheet to expand the heated and softened original resin sheet so as to project toward the lower pressure side, wherein the step (2) is now designated step (2') comprising installing the male mold member and the female mold member in the opposite sides relative to the heated and softened original resin sheet so that the male mold member is located in the lower pressure side, moving the male mold member relatively toward the female mold member while making the male mold member touch the heated and softened original resin sheet from its projecting side, thereby making the male mold member fit to the female mold member, rendering both a gap between the female mold member and the heated and softened original resin sheet and a gap between the male mold member and the heated and softened original resin sheet of reduced pressure, thereby making the resin sheet for forming the inner layer closely touch the surface of the male mold member and making the resin sheet for forming the outer layer closely touch the surface of the female mold member to form a hollow portion and to form the heated and softened original resin sheet into a shape of container.

3. A process for producing a plurality of a hollow foamed polyolefin-based resin containers comprising an inner layer and an outer layer, at least one of the inner and outer layers being formed of a foamed polyolefin-based resin sheet, wherein at least a side wall part of the container has a hollow portion between the inner and outer layers, wherein in the process a female mold member having an outer surface configuration of a container and a male mold member having an inner surface configuration of the container are used, the process comprising:

(1) heating and softening an original resin sheet while clipping and fixing the periphery of the original resin sheet with a clip, the original resin sheet being either (a) a resin sheet in which two resin sheets including a resin sheet for forming the inner layer and a resin sheet for forming the outer layer are laminated one on another wherein both of the two resin sheets are formed of a polyolefin-based resin and at least one of the two resin sheets is a foamed polyolefin-based resin sheet or (b) a resin sheet in which two resin sheets including a resin sheet for forming the inner layer and a resin sheet for forming the outer layer are separably laminated wherein both of the two resin sheets are formed of polyolefin-based resin and at least one of the two resin sheets is a foamed polyolefin-based resin sheet;

(2) making a partitioning member touch or almost touch the heated and softened original resin sheet to define container-forming areas;

(3) generating a pressure difference between both sides of the heated and softened original resin sheet so that a side where the partitioning member is present becomes the lower pressure side, making the heated and softened original resin sheet firmly touch the partitioning member, and projecting the heated and softened original resin sheet toward the lower pressure side in every container-forming area;

(4) installing the make mold member and the female mold member in the opposite sides relative to the heated and softened original resin sheet so that the male mold member is located in the lower pressure side, moving the male mold member relatively toward the female mold member while making the male mold member touch the heated and softened original resin sheet from its projecting side, thereby making the male mold member fit to the female mold member, rendering both a gap between the female mold member and the heated and softened original resin sheet and a gap between the male mold member and the heated and softened original resin sheet of reduced pressure, thereby making the resin sheet for forming the inner layer closely touch the surface of the male mold member and making the resin sheet for forming the outer layer closely touch the surface of the female mold member to form a hollow portion and to form the heated and softened original resin sheet into a shape of container; and (5) removing the product that has been formed into the shape of the container.

4. The process for producing a hollow foamed polyolefin-based resin container according to claim 3, wherein the partitioning member is a base body having a rib standing thereon, wherein the end surface of the rib touches the heated and softened original resin sheet to define the container-forming areas, and wherein the side where the partitioning member touches the heated and softened original resin sheet is set to be the lower pressure side.

5. The process for producing polyolefin-based resin container according to claim 4, wherein the partitioning member is a frame body which defines the container-forming areas cavities, wherein the frame body touches the heated and softened original resin sheet to define the container-forming areas, and wherein the side where the partitioning member touches the heated and softened original resin sheet is set to be the lower pressure side.

6. The process for producing a foamed polyolefin-based resin container according to any one of claims 2 to 3, wherein the pressure difference between both sides of the heated and softened original resin sheet is generated by applying a vacuum.

* * * * *